United States Patent [19]

Samera, Jr. et al.

[11] Patent Number: 4,934,744
[45] Date of Patent: Jun. 19, 1990

[54] ROTARY JOINT FOR CONVEYING FEEDWATER

[75] Inventors: Edward Samera, Jr., Orange; Ceasar U. Kosi, Garden Grove; Donald P. Flading, Pomona; Bertil H. Hedlund, West Covina, all of Calif.

[73] Assignee: Westinghouse Electric Corp., Pittsburgh, Pa.

[21] Appl. No.: 317,310

[22] Filed: Mar. 1, 1989

[51] Int. Cl.⁵ ............................................. F16L 53/00
[52] U.S. Cl. ...................................... 285/41; 285/14; 285/133.1; 285/187; 285/190; 285/275; 285/363; 285/373; 432/115
[58] Field of Search ............... 285/14, 134, 136, 190, 285/189, 41, 272, 273, 275, 373, 419, 133.1, 187, 363; 432/115

[56] References Cited

U.S. PATENT DOCUMENTS

| | | | |
|---|---|---|---|
| 3,243,212 | 3/1966 | May | 285/190 |
| 3,411,526 | 11/1968 | Schaefer | 285/273 |
| 3,606,394 | 9/1971 | Maurer et al. | 285/134 |
| 3,822,651 | 7/1974 | Harris et al. | 110/234 |
| 4,321,838 | 3/1982 | Feldman | 285/419 |
| 4,561,679 | 12/1985 | Choate | 285/190 |
| 4,735,157 | 4/1988 | Jurusz | 110/234 |

FOREIGN PATENT DOCUMENTS 388080 2/1933 United Kingdom ............... 285/419

Primary Examiner—Dave W. Arola

[57] ABSTRACT

A device for supplying feedwater to, and conveying feedwater from, a shaft tube assembly (20,22) of a machine having a rotary part, which assembly (20,22) has a longitudinal axis about which the assembly (20,22) rotates together with the rotary part, the device being composed of a housing which includes a cylindrical casing (2) having a cylindrical passage extending between its axial ends and a lateral feedwater passage (6) communicating with the cylindrical passage, a conduit member (8) having a second feedwater passage (10) and coupled to one axial end of the casing (2) to form a sealed joint with the casing (2), the conduit member (8) being positioned relative to the casing (2) such that the second feedwater passage (10) communicates with the cylindrical passage, and a closing member (12) coupled to the second axial end of the casing (2) to form a sealed joint with the casing (2), the closing member (12) having a circular opening coaxial with the cylindrical passage of the casing (2), the housing being constructed to receive the shaft tube assembly (20,22) such that the shaft tube assembly (20,22) extends through the circular opening of the closing member (12) and into the cylindrical passage of the casing (2) so that each feedwater passage (6,10) communicates with a respective one of a feedwater inlet (46) and feedwater outlet (48) of the assembly (20,22).

9 Claims, 2 Drawing Sheets

ROTARY JOINT FOR CONVEYING FEEDWATER

BACKGROUND OF THE INVENTION

The present invention relates to rotary joints for conveying feedwater to rotating machines, such as combustors.

In the operation of a rotary device, such as a combustor, it is necessary to supply feedwater to piping mounted for rotation with a rotating member, such as a barrel. The feedwater is supplied from, and returned to, a stationary water supply system. Therefore, the water supply system must be connected to the piping via a rotary joint supporting a shaft tube assembly which typically rotates about an axis coaxial with that of the rotary device.

Known rotary joints include a stationary housing enclosing a rotatable shaft tube assembly, with packings, usually of fibrous material, being employed to provide a seal between the shaft tube and the stationary housing. In the known structures, such packings must be provided at each end of the housing.

While such structures initially provide a satisfactory seal, it has been found that they develop leaks after a comparatively short period of time, apparently due to the fact that they lose their resiliency as the result of cyclic thermal expansion and contraction of the shaft tube assembly during repeated shutdowns and startups of the equipment.

SUMMARY OF THE INVENTION

It is an object of the present invention to provide a novel rotary joint which provides an effective long term seal.

Another object of the invention is to provide a rotary joint which requires an effective seal at only one end of the stationary housing.

Another object of the invention is to eliminate the use of packings to provide a seal between the rotary shaft tube and the stationary housing.

The above and other objects are achieved, according to the present invention, by a device for supplying feedwater to, and conveying feedwater from, a shaft tube assembly of a machine having a rotary part, which assembly has a longitudinal axis about which the assembly rotates together with the rotary part, the assembly having a longitudinal end remote from the machine and being provided with a feedwater inlet and a feedwater outlet, the feedwater inlet and feedwater outlet being spaced apart along the longitudinal axis of the assembly and one of the inlet and outlet being located at the longitudinal end of the assembly remote from the machine, which device comprises:

a housing composed of: a cylindrical casing having first and second axial ends, a cylindrical passage extending between the axial ends of the casing, and a lateral feedwater passage communicating with the cylindrical passage; a conduit member having a second feedwater passage and coupled to the first axial end of the casing to form a sealed joint with the casing, the conduit member being positioned relative to the casing such that the second feedwater passage communicates with the cylindrical passage; and a closing member coupled to the second axial end of the casing to form a sealed joint with the casing, the closing member having a circular opening coaxial with the cylindrical passage of the casing, the housing being constructed to receive the shaft tube assembly such that the shaft tube assembly extends through the circular opening of the closing member and into the cylindrical passage of the casing so that that one of the feedwater inlet and feedwater outlet which is located at the longitudinal end of the assembly communicates with the second feedwater passage and the other one of the feedwater inlet and feedwater outlet communicates with the lateral feedwater passage;

mechanical seal means disposed in the housing between the lateral feedwater passage and the closing member for forming a fluidtight seal with the shaft tube assembly;

second seal means disposed in the housing between the lateral feedwater passage and the second feedwater passage for forming with the shaft tube assembly a seal which limits the flow of fluid therepast; and bearing means disposed in the casing for supporting the shaft tube assembly for rotation relative to the housing.

DESCRIPTION ON OF THE PREFERRED EMBODIMENTS

Figure 1:
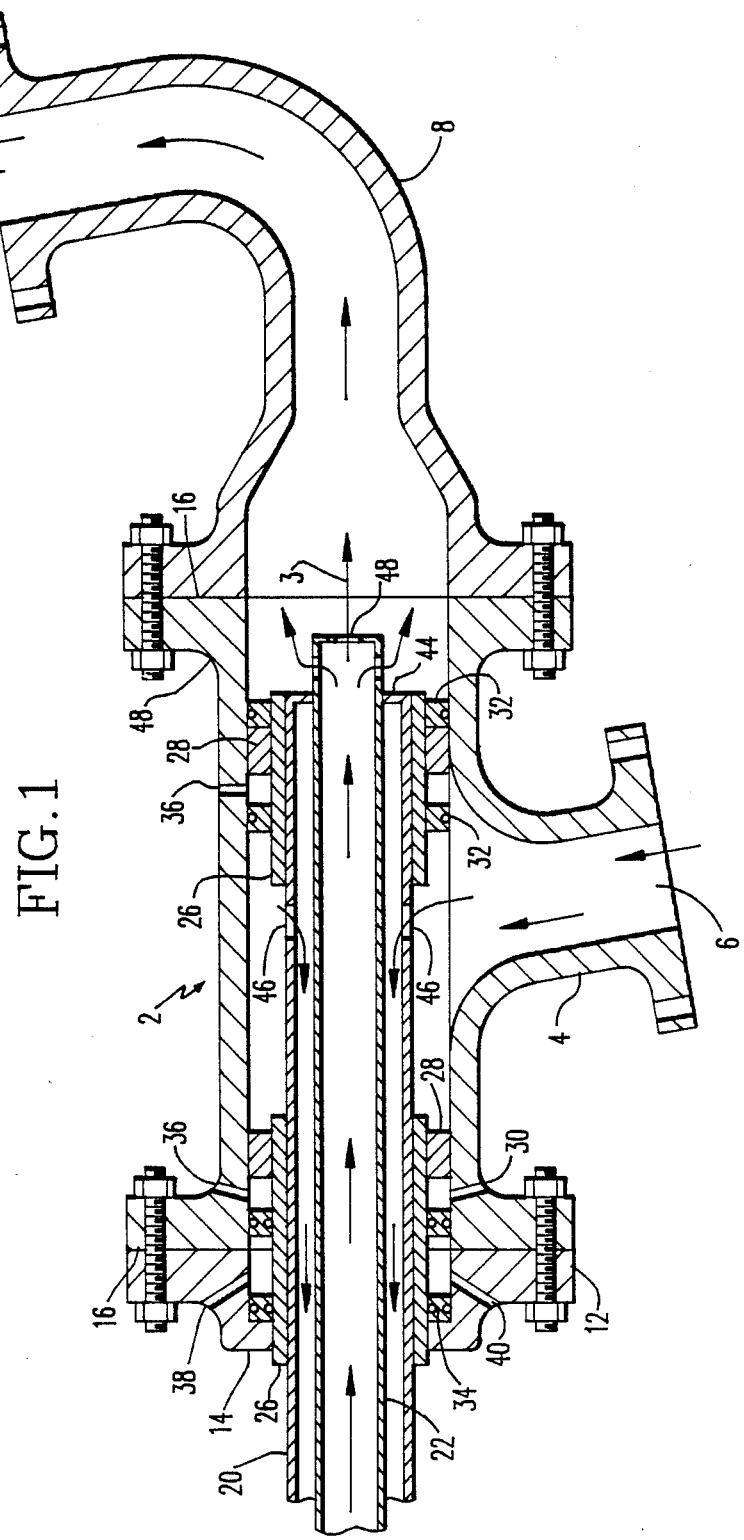
FIG. 1 is a longitudinal, cross-sectional view of a preferred embodiment of a rotary joint according to the present invention.

A preferred embodiment of a rotary joint according to the present invention is illustrated in FIG. 1. This device includes a stationary housing composed of a generally horizontally extending casing 2 having a flange at each axial end. Casing 2 is composed of two semicylindrical halves joined together along an axially extending, generally horizontal plane 3, with a suitable seal (not shown) being disposed between the two halves. Casing 2 is provided along its lower side with a nipple 4 containing a water inlet passage 6 which communicates with the interior of casing 2. The housing further includes an elbow reducer 8 having a water outlet passage 10 which communicates with the interior of casing 2. Nipple 4 and reducer 8 are provided with flanges for connection to a feedwater unit. Reducer 8 constitutes a cap at one axial end of casing 2.

Since a static connection exists between casing 2 and reducer 8, an effective, long term, seal can easily be provided therebetween.

The opposite end of casing 2 is coupled to a flange 12 having an inwardly extending lip 14. The joints between casing 2 and both elbow reducer 8 and flange 12 are tightly sealed by means of metal gaskets 16. A shaft tube assembly which includes an outer pipe 20 and an inner pipe 22 projects into the housing via flange 12. The end of the shaft tube assembly which is not illustrated is coupled to piping in the associated combustor barrel in order to convey feedwater to and from the barrel. The shaft tube assembly extends along the axis of rotation of the combustor and rotates, with the combustor barrel, relative to the illustrated housing.

The outer surface of outer pipe 20 is provided with two axially spaced shaft sleeves 26 which are welded to the outer surface of pipe 20. Outer pipe 20 is supported within the housing via conventional bearings 28.

The interior of casing 2 is sealed, at the end adjacent flange 12, by a high pressure, high temperature mechanical seal 30 and is separated from passage 10 in elbow reducer 8 by breakdown bushings 32 which provide a buffer between the central region of the interior of casing 2 and passage 10.

Between the left-hand sleeve 26 and flange 12 there is provided a low pressure, low temperature mechanical seal 34 which is axially supported by lip 14.

The breakdown bushing 32 which borders the central region of the interior of casing 2 is axially spaced from the associated bearing 28 to form a cooling gap which is fed with cooling water of feedwater quality via an inlet 36. Similarly, seal 30 is axially spaced from the left-hand bearing 28 to form a further cooling gap which is supplied with the cooling water via a further inlet 36.

An additional cooling gap is provided between seals 30 and 34 and this gap is connected to a cooling water inlet 38 and a cooling water outlet 40.

The end of outer pipe 20 which is located within casing 2 is provided with a disk 44 which seals the end of pipe 20 and supports pipe 22.

In the center region of the interior of casing 2, outer pipe 20 is provided with inlet holes 46 via which feedwater is admitted to the interior of pipe 20. Similarly, inner pipe 22 is provided with feedwater outlet holes 48 which are located to the right of disk 44 and via which feedwater which has passed through the combustor flows into outlet passage 10.

Since passage 10 extends axially from the interior of casing 2 and elbow reducer 8 forms a cap at one axial end of casing 2, one source of water leakage from casing 2 is effectively eliminated and a tight seal need not be provided between the interior of casing 2 and passage 10. Cooling water introduced via inlets 36 can drain off to the interior of casing 2 and to outlet passage 10.

On the other hand, the end of the device from which the shaft tube assembly emerges, via flange 12, is sealed in a highly effective manner by the series arrangement of high pressure, high temperature mechanical seal 30 and low pressure, low temperature mechanical seal 34.

At the end of the housing defined by flange 12, inlet 38 and outlet 40 form a cooling water loop which will not only effectively cool seals 30 and 34 but will also provide a drain path for any water leaking past seal 30 from the interior of casing 2 so that there will be no pressure buildup in the cooling gap between seals 30 and 34.

The use of mechanical seals according to the present invention provides longer seal life than was provided by the packings employed in the prior art. In addition, the use of whole, i.e. one-piece, mechanical seals promotes effective sealing.

Since casing 2 is split longitudinally into two parts, maintenance and servicing of the device are facilitated.

In addition, sleeves 26 are free to move axially relative to bearings 28, bushings 32 and seals 30 and 34, thereby allowing for thermal expansion of the shaft tube assembly.

It will be appreciated that a device according to the present invention could also be associated with a shaft tube assembly in which feedwater flows to the combustor via inner pipe 22 and from the combustor via outer pipe 20. In this case, passage 10 would be the feedwater inlet passage and passage 6 would be the feedwater outlet passage.

In the illustrated device, feedwater flows in the directions indicated by the arrows.

Figure 2:
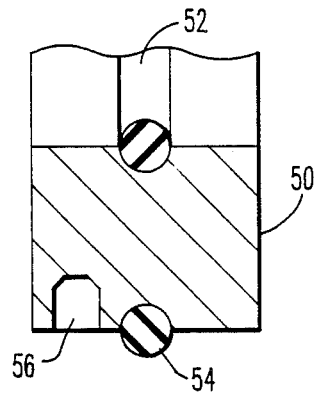
FIGS. 2 and 3 are cross-sectional detail views of two components employed in the device of FIG. 1.

One suitable embodiment of each of seals 30 and 34 is illustrated in FIG. 2 and is composed of a metal ring 50 provided with annular grooves of semicircular cross section in its inner and outer peripheral surfaces. A sealing ring 52 is seated in the groove at the inner peripheral surface and a sealing ring 54 is seated in the groove at the outer peripheral surface. Sealing rings 52 and 54 may be made of any suitable resilient material, such as rubber or an appropriate elastomer.

Metal ring 50 is additionally provided with a plurality of blind bores 56 each extending radially from the outer peripheral surface of ring 50. Each bore 56 is arranged to be associated with a respective radial bore in flange 12 or casing 2, respectively, with a retaining pin being inserted through the bores to prevent axial and radial displacement of ring 50. During operation of the device illustrated in FIG. 1, rotation of the shaft tube assembly will impose a rotational force on the associated ring 50 which will have the effect of clamping each radial pin in its respective bore 56.

Figure 3:
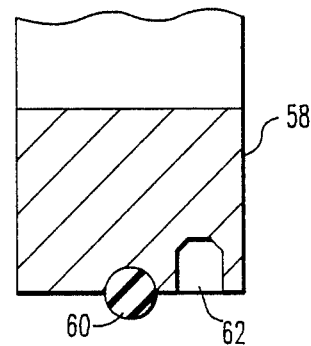

FIG. 3 presents a similar illustration of one suitable embodiment of each breakdown bushing 32, composed of a metal ring 58 having a sealing ring 60 seated in a groove formed in the outer peripheral surface of ring 58. A plurality of blind bores 62 are also formed in the outer peripheral surface of ring 58 for the same purpose as each bore 56 shown in FIG. 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A device for supplying feedwater to, and conveying feedwater from, a shaft tube assembly of a machine having a rotary part, which assembly has a longitudinal axis about which the assembly rotates together with the rotary part, the assembly having a longitudinal end remote from the machine and being provided with a feedwater inlet and a feedwater outlet, the feedwater inlet and feedwater outlet being spaced apart along the longitudinal axis of the assembly and one of the inlet and outlet being located at the longitudinal end of the assembly remote from the machine, said device comprising:

a housing composed of: a cylindrical casing having first and second axial ends, a cylindrical passage having a longitudinal axis extending between said axial ends of said casing, and a first feedwater passage communicating with said cylindrical passage; a conduit member having a second feedwater passage and coupled to said first axial end of said casing to form a sealed joint with said casing, said conduit member being positioned relative to said casing such that said second feedwater passage communicates with, and extends along the longitudinal axis of, said cylindrical passage; and a closing member coupled to said second axial end of said casing to form a sealed joint with said casing, said closing member having a circular opening coaxial with said cylindrical passage of said casing, said housing being constructed to receive the shaft tube assembly such that the shaft tube assembly extends through said circular opening of said closing member and into said cylindrical passage of said casing so that that one of the feedwater inlet and feedwater outlet which is located at the longitudinal end of the assembly communicates with said second feedwater passage and the other one of the feedwater inlet and feedwater outlet communicates with said first feedwater passage and so that a free space is provided within said housing adjacent the longitudinal end of the assembly and along the longitudinal axis of the assembly;

mechanical seal means disposed in contact with said casing between said first feedwater passage and said closing member for forming a fluidtight seal with the shaft tube assembly;

second seal means disposed in contact with said casing between said first feedwater passage and said second feedwater passage for forming with the shaft tube assembly a seal which limits the flow of fluid therepast; and bearing means disposed in said casing for supporting the shaft tube assembly for rotation relative to said housing and for movement relative to said housing in the direction of the longitudinal axis of the assembly.

2. A device as defined in claim 1 wherein said conduit member is formed such that said second feedwater passage follows a curved path.

3. A device as defined in claim 1 wherein said mechanical seal means comprise two mechanical seals spaced apart parallel to the axial direction of said casing to delimit a first cooling gap, and said housing is provided with a first inlet passage communicating with said first cooling gap for supplying cooling water thereto and a first outlet passage communicating with said first cooling gap for removing cooling water therefrom.

4. A device as defined in claim 3 wherein said bearing means comprise a first bearing located between said mechanical seal means and said first feedwater passage and spaced axially from said mechanical seal means to define a second cooling gap, and said housing is provided with a second inlet passage communicating with said second cooling gap for supplying cooling water thereto.

5. A device as defined in claim 4 wherein said second seal means comprise two breakdown bushings constructed to permit limited fluid flow between said first feedwater passage and said second feedwater passage and spaced apart parallel to the axial direction of said casing to delimit a third cooling gap, and said housing is provided with a third cooling water inlet passage communicating with said third cooling gap for supplying cooling water thereto.

6. A device as defined in claim 5 wherein said bearing means comprise a second bearing disposed between said two breakdown bushings.

7. A device as defined in claim 6 wherein said cylindrical casing is composed of two casing parts joined together along a plane containing the axis of said casing, and said first feedwater passage is located entirely in one of said casing parts.

8. A device as defined in claim 1 wherein said cylindrical casing is composed of two casing parts joined together along a plane containing the axis of said casing, and said first feedwater passage is located entirely in one of said casing parts.

9. A device as defined in claim 1 wherein the machine is a rotary combustor and the shaft tube assembly is composed of two coaxial tubes, with the feedwater inlet being located in one of the tubes and the feedwater outlet being located in the other one of the tubes.

* * * * *